US006275224B1

(12) United States Patent
Carter

(10) Patent No.: US 6,275,224 B1
(45) Date of Patent: *Aug. 14, 2001

(54) GROUP SITUATION BOARD SYSTEM AND METHOD OF OPERATION

(75) Inventor: Jerry K. Carter, Southfield, MI (US)

(73) Assignee: Electronic Data Systems Corporation, Plano, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/801,877

(22) Filed: Feb. 18, 1997

(51) Int. Cl.$^7$ ........................................... G06F 3/00
(52) U.S. Cl. ..................... 345/332; 345/331; 709/213
(58) Field of Search ..................... 345/329, 331, 345/333, 334, 335, 339, 340, 332, 346, 356, 326, 330; 395/200.01, 800, 200.11, 200.03; 709/200, 210, 215

(56) References Cited

U.S. PATENT DOCUMENTS

| | | | |
|---|---|---|---|
| 5,508,713 | * | 4/1996 | Okouchi .................................. 348/15 |
| 5,572,643 | * | 11/1996 | Judson ................................... 345/793 |
| 5,586,255 | * | 12/1996 | Tanaka et al. ...................... 395/200.01 |
| 5,596,702 | * | 1/1997 | Stucka et al. ........................... 345/340 |
| 5,603,034 | * | 2/1997 | Swason ................................... 395/333 |
| 5,644,714 | * | 7/1997 | Kikinis .............................. 395/200.03 |
| 5,664,207 | * | 9/1997 | Crumpler et al. ..................... 344/766 |
| 5,758,186 | * | 5/1998 | Hamilton et al. ................ 395/200.33 |
| 5,794,006 | * | 8/1998 | Sanderman ........................... 395/500 |
| 5,819,048 | * | 10/1998 | Okazaki et al. ....................... 345/329 |
| 5,838,906 | * | 11/1998 | Doyle et al. ..................... 395/200.23 |
| 5,940,082 | * | 8/1999 | Brinegar et al. ...................... 345/442 |

* cited by examiner

Primary Examiner—Raymond J. Bayerl
Assistant Examiner—Cao H. Nguyen
(74) Attorney, Agent, or Firm—Baker Botts LLP

(57) ABSTRACT

A network (10) is provided that has a network server (12) and a plurality of client systems (14). The network server (12) executes a server application (16), and the plurality of client systems (14) each execute a client application (20). The client applications (20) create and display situation board windows (22) on each client system (14) and allow users of each client system (14) to view information and submit information for the situation board windows (22). The server application (16) receives submitted information from the client applications (20) and maintains a current state of group information to be displayed in the situation board windows (22). The server application (16) also updates the situation board windows (22) such that the users are displayed the group information in the respective situation board windows (22).

17 Claims, 1 Drawing Sheet

GROUP SITUATION BOARD SYSTEM AND METHOD OF OPERATION

TECHNICAL FIELD OF THE INVENTION

This invention relates in general to the field of electronic systems, and more particularly to a group situation board system and method of operation.

BACKGROUND OF THE INVENTION

Networks are widely used in the workplace to interconnect users within an organization. Such networks can include local area networks (LAN), wide area networks (WAN), intranets and the Internet. One network software application that is commonly used across such networks is electronic mail. Electronic mail allows the various users on the network to communicate messages with one another. Some networks also allow users to use broadcast messages to communicate discrete messages to one or more other users. In particular, some networks allow network administrators to provide message ribbons at the bottom of each network user's display. Chat technology across intranets and the Internet also allows users to group together to communicate information.

It is desirable to provide users with a means of updating and distributing information to multiple users in such a way that information can be seen within seconds while also being retained for ongoing use. For example, in a mortgage firm environment where pricing for various products change during the business day, it can be important to provide all brokers with up-to-date information about products. Although new product quotes are received by different brokers, this information is important to all brokers regardless who initially receives the information.

SUMMARY OF THE INVENTION

In accordance with the present invention, a group situation board system and method of operation are provided that provide advantages over conventional network applications.

According to one embodiment of the present invention, a network is provided that has a network server and a plurality of client systems. The network server executes a server application, and the plurality of client systems each executes a client application. The client applications create and display situation board windows on each client system and allow users of each client system to submit information to be displayed in the situation board windows. The server application receives information submitted from the client applications and maintains a current state of group information to be displayed in the situation board windows. The server application also updates the situation board windows such that the users are displayed the group information in the respective situation board windows.

A technical advantage of the present invention is the ability to allow a group of users to view, edit and update group information in addition, new group information is forced to be displayed within a predefined interval of time. Another technical advantage is to display multiple situation board windows to a user where each situation board window displays information associated with a different group of which the user is a member.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

Figure 1:
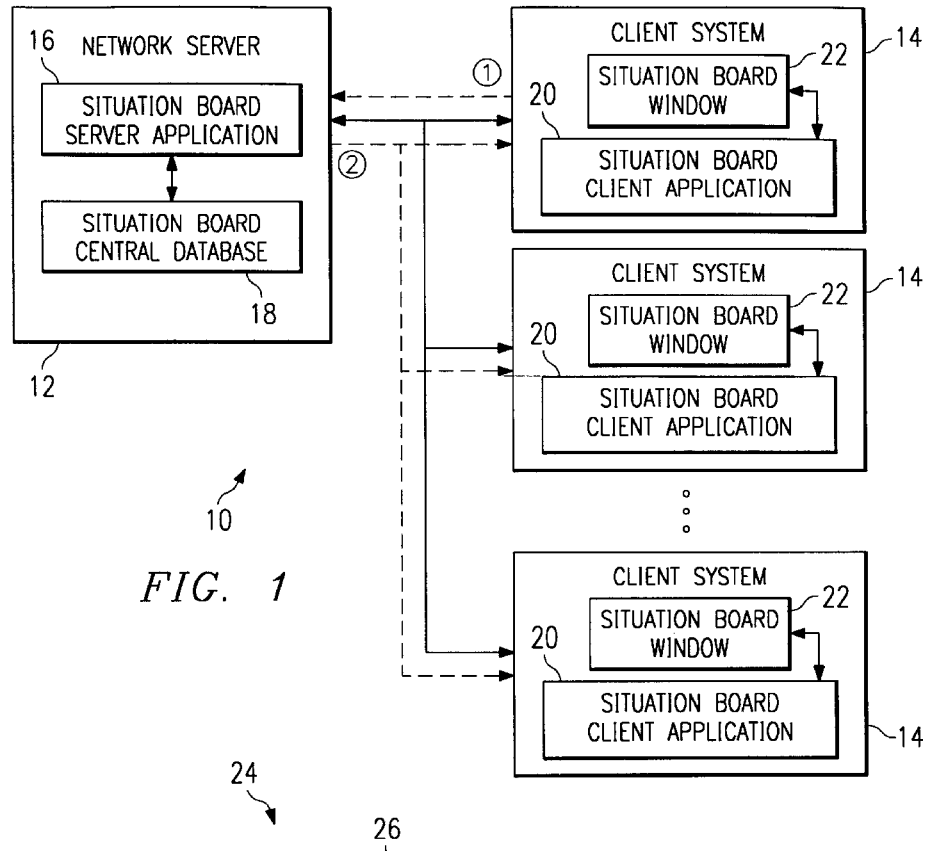
FIG. 1 is a block diagram of one embodiment of a network interconnecting a plurality of users and providing each user with a situation board window.

FIG. 1 is a block diagram of one embodiment of a network, indicated generally at 10, interconnecting a plurality of users and providing each user with a situation board window. Network 10 connects a network server 12 with a plurality of client systems 14. Network can comprise a local area network (LAN), wide area network (WAN), intranet, the Internet or combination thereof. Network server 12 and client systems 14 can each comprise a personal computer, a workstation, or other computer system, and each have a processor, memory, fixed data storage and other typical computer components.

In the embodiment of FIG. 1, network server 12 executes a situation board server application 16 that maintains a situation board central database 18. Each client system 14 executes a situation board client application 20 that creates and displays a situation board window 22 presented to the user of each client system 14. Situation board window 22 can be a window in a windowing operating system such as WINDOWS 95. The situation board windows 22 display information concerning a current situation of a group of users, such as current pricing for products being sold by the users.

In operation, each situation board window 22 allows each user to view, edit and update group information and displays common information to all of the users. Situation board windows 22 provide the users of client systems 14 with a virtual information board on which they can communicate information. Server application 16 and client applications 20 can provide quick communication between a non-centralized group of users who are located such that they can not view a common physical information board. This group information system is more effective than electronic mail because every time the group information is modified, the new information is displayed to the other users within a defined interval of time. In one embodiment, this defined interval of time is every thirty seconds. The client and server applications maximize productivity by allowing communication without occupying the telephone and reduces the use of "sticky" notes. The client and server applications are also more dynamic than using broadcast messages because of the ease with which users can view, edit and rebroadcast portions of the group information.

In the illustrated embodiment, client application 20 in each client system 14 is an active process that monitors the situation board window 22 to determine whether or not a user desires to make changes to the group situation information. Server application 16 is a centralized executable that maintains consistency across situation board windows 22 and maintains entries in central database 18 to reflect the current state of the information to be displayed in situation board windows 22. For example, a user of one client system 14 can enter a new message in situation board window 22 of his client system 14. The user can then indicate that the new message should be posted to all situation board windows 22. As shown by step number "1" in FIG. 1, an associated client application 20 receives the new message and sends that information to server application 16. Server application 16 then updates central database 18 to reflect the new state of the group information. Using central database 18, server application 16 ensures that the group information is maintained for ongoing use. As shown by step "2" in FIG. 1, server application 16 then sends new information to update situation board window 22 of each client system 14. This updating of situation board windows 22 can be synchronized or can be performed at defined intervals of time. In one embodiment, the defined intervals of time are timed beginning when each user initiates his client application 20. Consequently, in this embodiment, updating of situation board windows 22 is not synchronized.

The present invention is particularly beneficial to users within an organization where groups of users need to share common information that is frequently updated but used in an ongoing manner. For example, in a mortgage broker environment, where brokers are quoting product pricing to customers over the telephone, it is important for each broker to know up-to-date pricing without using the telephone. The present invention allows any broker who receives new pricing information for a product to post that price to the group situation board. That information is then updated in the central database and updated to the other group situation board windows. In this manner, each user is provided with current pricing information in his situation board window 22.

It should be understood that, in other embodiments, server applications 16 could maintain information about multiple situation boards for multiple groups of users. Further, the groups of users may or may not have overlaps among members. For example, one broker may be a member of three groups that sell three different sets of products. That broker could have three open situation board windows on his client system 14, where each situation board provides pricing information for an associated set of products. It should also be understood that the situation board system of the present invention could be implemented using a number of types of networks. In particular, in an intranet or Internet embodiment, JAVA applets or JAVA script could be used to maintain situation board windows inside of web browsers on each client system. This type of implementation would be particularly useful where users are separated across physical locations.

In one embodiment of the present invention, client applications 20 notify server application 16 if a user is making changes to his situation board window 22. During this period of change, the first user to begin making changes to situation board window 22 is granted access and other users are blocked from access. This ensures that multiple users do not modify the situation board at the same time and create conflicts.

Figure 2:
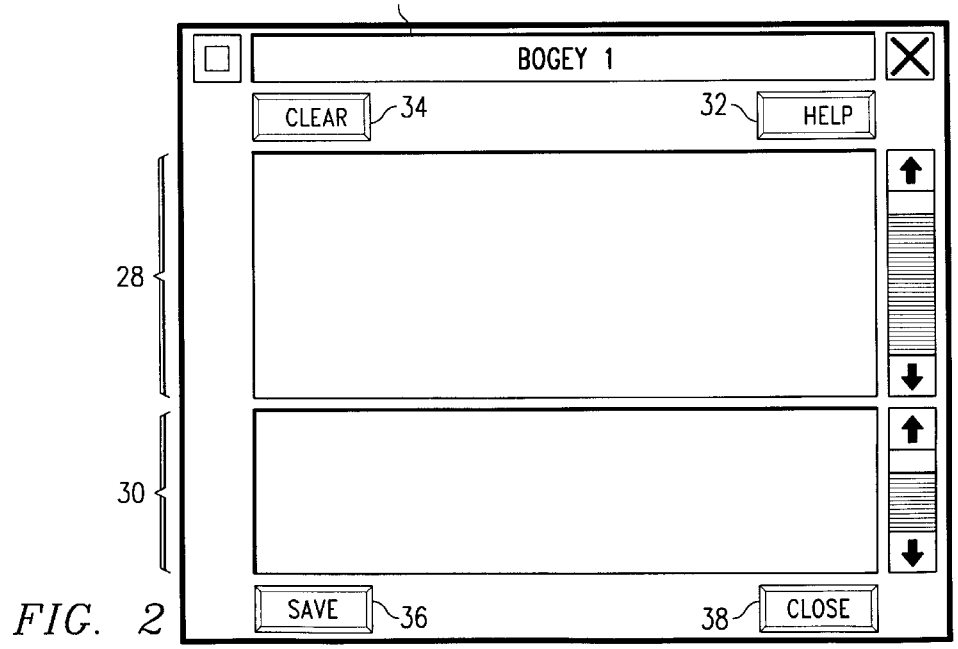
FIG. 2 illustrates one embodiment of a situation board window provided to users on a network.

FIG. 2 illustrates one embodiment of a situation board window, indicated generally at 24, provided to users on a network. In the embodiment of FIG. 2, situation board window 24 includes a title 26, a group information display area 28, and an information entry area 30. Both group information display area 28 and information entry area 30 have scroll bars to allow a user to scroll through information. Situation board window 24 further includes an "HELP" button 32, a "CLEAR" button 34, a "SAVE" button 36, and a "CLOSE" button 38. "CLOSE" button 38 allows the user to close situation board window 24. "SAVE" button 36 allows the user to submit new information to be included in group information display area 28. "CLEAR" button 34 allows the user to delete the information in group information display area 28. Lastly, "HELP" button 32 allows the user to display user help documentation about the situation board application and the functions of the items within situation board window 24. It should be understood that in other implementations additional or different buttons and features could be included in situation board window 24.

Group information display area 28 displays to the user the current state of the group information. As discussed above, this information is centrally maintained and can be stored in a centralized database or other centralized storage on a network server. Information entry area 30 provides an area in which the user can enter new information to post to the situation board. Situation board window 24 thereby provides users within an organization with a virtual board on which to maintain important group information.

Although the present invention has been described in detail, it should be understood that various changes, substitutions and alterations can be made hereto without departing from the spirit and scope of the invention as defined by the appended claims.

What is claimed is:

1. A group situation board window system, comprising:

a network server executing a server application;

a plurality of client systems each executing a client application;

each client application creating, displaying and monitoring at least one situation board window on each client system and allowing a user of each client system to view information, edit the information to create new information, and submit the new information for the at least one situation board window to the client application; and the server application receiving a notification from the client application that it has the new information to submit to the server application, the server application further receiving submitted information from the client applications, using the submitted information from the client applications to maintain a current state of common group information to be displayed in the at least one situation board window, and updating at a defined interval of time the situation board windows such that separate users are concurrently displayed the current state of common group information in the respective at least one situation board window;

wherein each said client application is responsive to initiation of editing by a user of information in the situation board window of that client application for sending a notice to the server application; and wherein the server application is responsive to receipt of the notice for preventing other client applications from altering the common group information until the user who triggered the notice has finished editing information, the edited information has been incorporated into the common group information, and the situation board windows of the client applications have thereafter been updated from the common group information.

2. The system of claim 1, further comprising a central database for storing the current state of common group information.

3. The system of claim 1, wherein:

the client applications further create, display and monitor additional situation board windows on each client system associated with a different business group; and the server further maintains a current state of common group information to be displayed in the additional situation board windows associated with each business group, and updates at a defined interval of time the situation board windows such that users are displayed the current state of common group information in those additional situation board windows associated with a given business group.

4. The system of claim 1, wherein the network server is a server for a local area network, and the client systems are connected across the local area network.

5. The system of claim 1, wherein the network server is a server for an intranet, and the client systems are connected across the intranet.

6. The system of claim 5, wherein the client applications are implemented using applet code downloaded across the intranet.

7. A group situation board client system, comprising:

a client application executed by the client system, the client application operable to communicate with a server application executed by a network server;

a situation board window created, displayed and monitored by the client application, the situation board window allowing a user of the client system to view common group information, edit the information to create new information, and submit the new information for the situation board window to the client application; and the client application notifying the server application that it has the new information to submit to the server application, the server application receiving submitted information from the client application, using the submitted information from the client application to maintain a current state of common group information to be displayed in the situation board window by the client application, and updating at a defined interval of time the situation board window such that other users are concurrently displayed the current state of common group information in respective situation board windows;

wherein the client application is responsive to initiation of editing by a user of information in the situation board window of that client application for sending a notice to the server application; and wherein the server application is responsive to receipt of the notice for preventing alteration of the common group information by other users until the user who triggered the notice has finished editing information, the edited information has been incorporated into the common group information, and then the common group information has been displayed to other users.

8. The client system of claim 7, wherein:

the client application further creates, displays and monitors additional situation board windows, each of the additional situation board windows associated with a different business group; and the server application further maintains a current state of common group information in the additional situation board windows associated with each business group, and updates at a defined interval of time the situation board windows such that users are displayed the current state of common group information in those additional situation board windows associated with a given business group.

9. The client system of claim 7, wherein the client system communicates with the server application across a local area network.

10. The client system of claim 7, wherein the client system communicates with the server application across an intranet.

11. The client system of claim 10, wherein the client application is implemented using applet code downloaded across the intranet.

12. A method for providing a group situation board to users of a plurality of client systems, comprising:

creating, displaying and monitoring at least one situation board window containing common group information on each client system;

allowing users of each client system to view the common group information, edit the information to create new information, and submit the new information for the at least one situation board window;

identifying the new information submitted by users;

using the new information submitted by users to maintain a current state of common group information; and updating at a defined interval of time the at least one situation board window with the new information such that separate users are concurrently displayed the current state of common group information in the at least one situation board window;

causing each said client system to respond to initiation of editing by a user of information in the situation board window of that client system by issuing a notice; and responding to issuance of the notice by preventing other client systems from altering the common group information until the user who triggered the notice has finished editing information, the edited information has been incorporated into the common group information, and then the common group information has been displayed to other users.

13. The method of claim 12, further comprising maintaining the current state of common group information in a central database coupled to the client systems.

14. The method of claim 12, further comprising:

creating, displaying and monitoring additional situation board windows on each client system, each of the additional situation board windows on a client system associated with a different business group;

maintaining a current state of common group information in the additional situation board windows associated with each business group; and updating the additional situation board windows such that users are displayed the current state of common group information in those additional situation board windows associated with a given business group.

15. The method of claim 12, wherein the plurality of client systems are connected across a local area network.

16. The method of claim 12, wherein the plurality of client systems are connected across an intranet.

17. The method of claim 16, wherein the situation board windows are created and displayed using applet code downloaded across the intranet.

* * * * *